US008885924B2

United States Patent
Haglund et al.

(10) Patent No.: US 8,885,924 B2
(45) Date of Patent: Nov. 11, 2014

(54) THREE DIMENSIONAL MODEL METHOD BASED ON COMBINATION OF GROUND BASED IMAGES AND IMAGES TAKEN FROM ABOVE

(75) Inventors: Leif Haglund, Brokind (SE); Johan Borg, Linköping (SE); Ingemar Andersson, Linköping (SE); Folke Isaksson, Linköping (SE)

(73) Assignee: SAAB AB, Linköping (SE)

( * ) Notice: Subject to any disclaimer, the term of this patent is extended or adjusted under 35 U.S.C. 154(b) by 198 days.

(21) Appl. No.: 13/575,372

(22) PCT Filed: Jan. 26, 2010

(86) PCT No.: PCT/SE2010/000014
§ 371 (c)(1),
(2), (4) Date: Oct. 22, 2012

(87) PCT Pub. No.: WO2011/093751
PCT Pub. Date: Aug. 4, 2011

(65) Prior Publication Data
US 2013/0041637 A1     Feb. 14, 2013

(51) Int. Cl.
G06T 17/00      (2006.01)
G01C 11/06      (2006.01)
G06T 17/05      (2011.01)

(52) U.S. Cl.
CPC ............... *G01C 11/06* (2013.01); *G06T 17/05* (2013.01)
USPC ......................................................... 382/154

(58) Field of Classification Search
None
See application file for complete search history.

(56) References Cited

U.S. PATENT DOCUMENTS

| 7,509,241 | B2 * | 3/2009 | Guo et al. ........................ 703/2 |
| 8,284,190 | B2 * | 10/2012 | Muktinutalapati et al. ... 345/419 |
| 2008/0111815 | A1 * | 5/2008 | Graves et al. .................. 345/420 |
| 2008/0221843 | A1 | 9/2008 | Shenkar et al. |
| 2010/0201682 | A1 * | 8/2010 | Quan et al. ..................... 345/419 |
| 2011/0181589 | A1 * | 7/2011 | Quan et al. ..................... 345/420 |
| 2011/0286660 | A1 * | 11/2011 | Ofek et al. ..................... 382/154 |

FOREIGN PATENT DOCUMENTS

EP       1 607 716 A2    12/2005
JP       2006-003280 A    1/2006

OTHER PUBLICATIONS

Snavely et al., "Modeling the World from Internet Photo Collections", Int J Comput Vis, Springer, 2007, 22 pages total.*
Frueh et al., "3D Model Generation for Cities Using Aerial Photographs and Ground Level Laser Scans", IEEE Conference on Computer Vision and Pattern Recognition, Kauai, USA, 2001, vol. 2.2, 8 pages total.*

(Continued)

*Primary Examiner* — Brian P Werner
(74) *Attorney, Agent, or Firm* — Venable LLP; Eric J. Franklin

(57) ABSTRACT

A three dimensional model method based on combination of ground based images and images taken from above. An existing 3D model based on images taken from above is matched with images taken from ground level. All images including information about position and attitudes of the camera when the images from ground level and the images taken from above were taken and direction of each pixel. The method offers an automatically carried out imaging solving or at least mitigating occlusion problems.

9 Claims, 4 Drawing Sheets

(56) References Cited

OTHER PUBLICATIONS

Isaksson et al., "3D Rapid Mapping", Airborne Intelligence, Surveillance, Reconnaissance (ISR) Systems and Applications V., Proc. of SPIE vol. 6946, 69460D, 2008.*
PCT/ISA/210—International Search Report—Oct. 1, 2010.
PCT/ISA/237—Written Opinion of the International Searching Authority—Oct. 1, 2010.
PCT/IPEA/409—International Preliminary Report on Patentability—Jan. 3, 2012.
C. Fruh et al; "Construction 3D models by merging aerial and ground views"; Computer Graphics and Applications; IEEE, Nov./Dec. 2003; pp. 52-61, Figure 13; Abstract.

* cited by examiner

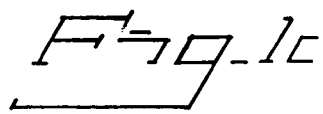
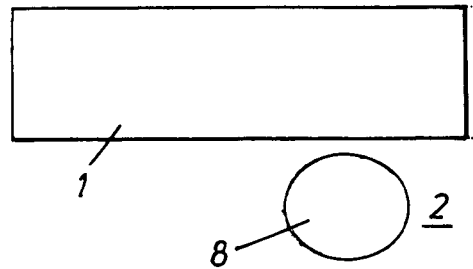
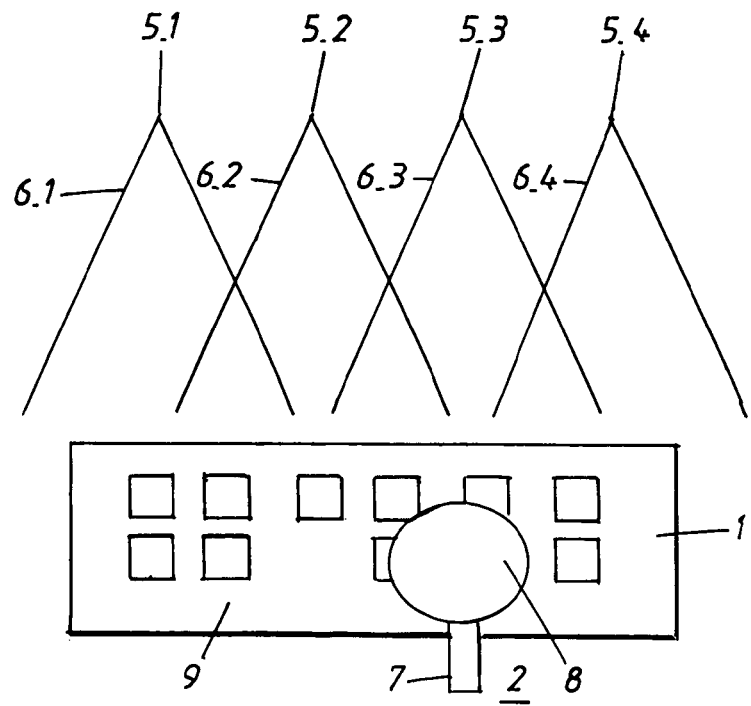

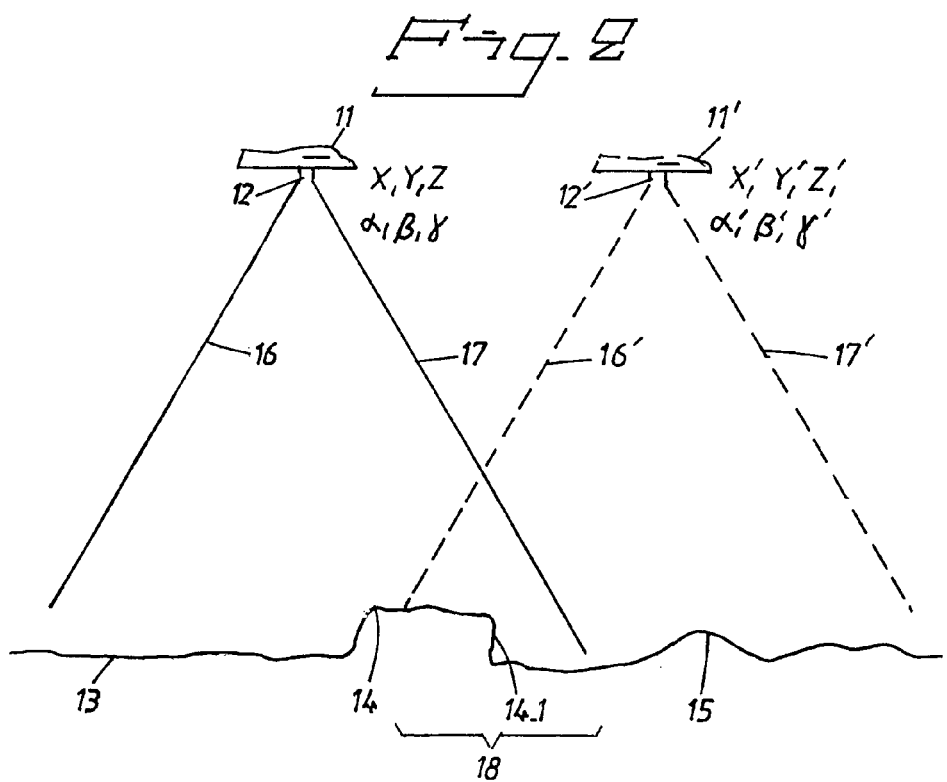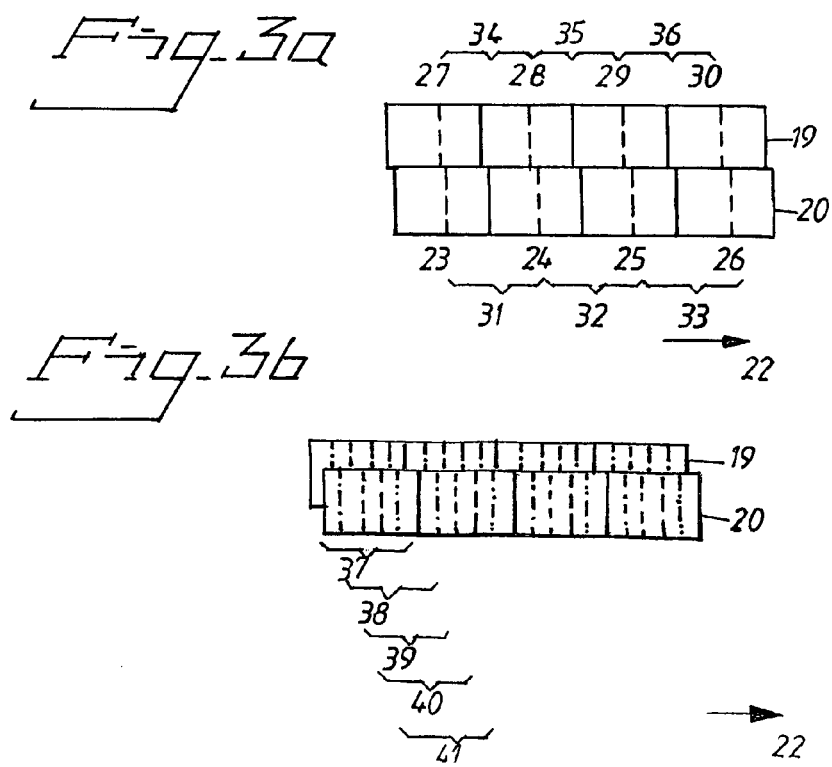

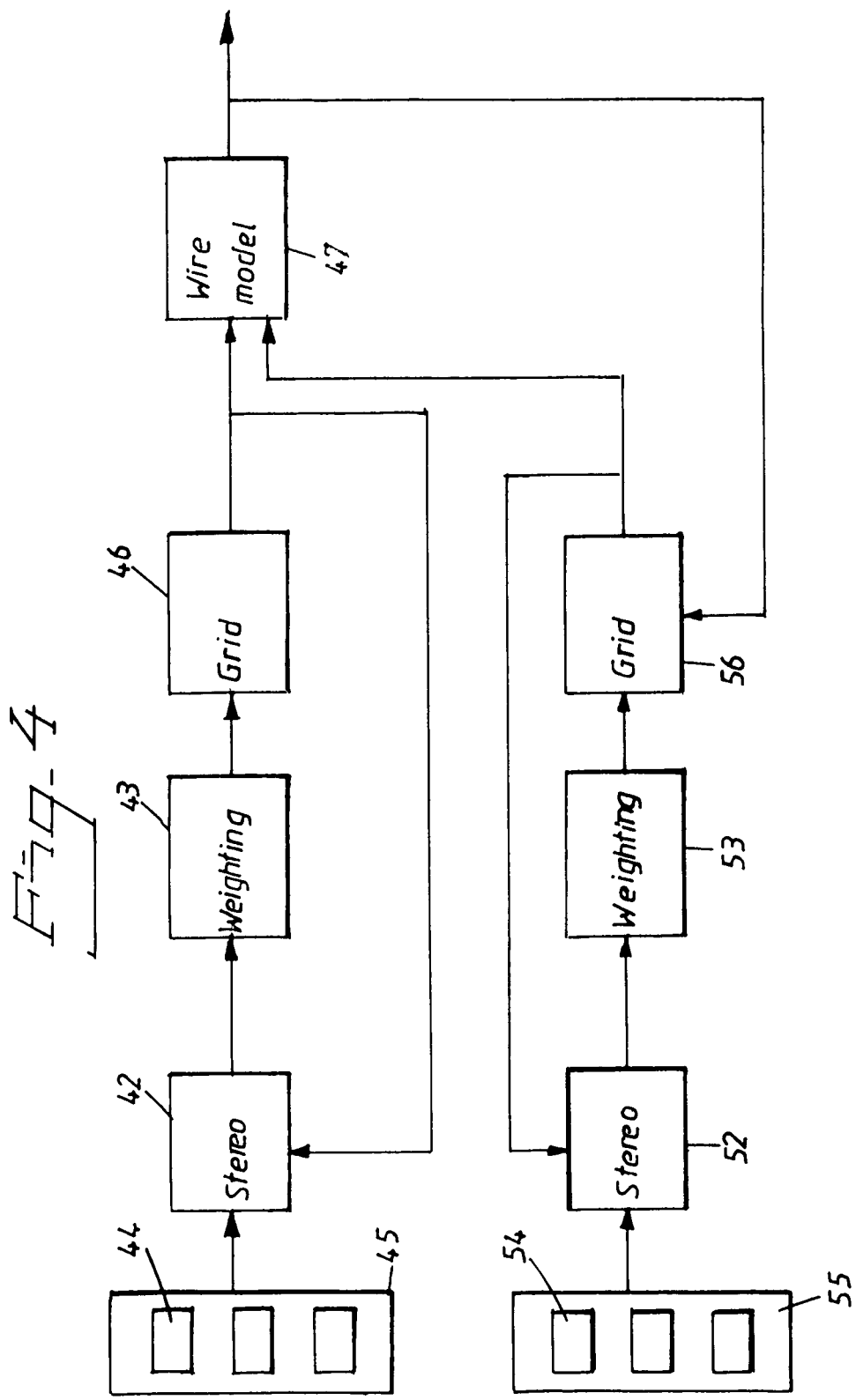

THREE DIMENSIONAL MODEL METHOD BASED ON COMBINATION OF GROUND BASED IMAGES AND IMAGES TAKEN FROM ABOVE

CROSS-REFERENCE TO RELATED APPLICATIONS

This application is the national phase under 35 U.S.C. §371 of PCT/SE2010/000014 filed 26 Jan. 2010.

TECHNICAL FIELD

The present invention relates to a three dimensional model method based on combination of ground based images and images taken from above.

In this connection ground based images are to include images taken directly from ground as well as images taken from a low height for example by a low flying helicopter.

BACKGROUND

The basic idea to combine images taken from a ground based equipment with images taken from the air by means of for example air planes is inter alia known from U.S. 2008/0221843 A1 and also from an article by Fruhe C. et al "Constructing 3D City Models by Merging Ground-Based and Airborn views" in Proceedings of the 2003 IEEE Computer Society Conference on Computer Vision and Pattern Recognition (CVPR'03).

The solutions according these two references to combine images taken from ground based equipment and images taken from the air are rather complex and involves manual processing of the image information. Furthermore there is no discussion about the complex of problems that arises due to occlusion. Examples of objects causing occlusions as obscuration are obscuration from trees, light poles, cars etc.

It could also be noted that there are available solutions today to build views from images taken from the street and often called "street views". These solutions are based on images, often covering 360 degrees taken from a known geo-referenced location with known directions. By choosing a specific point, e.g. on a map, it is possible to view the environment from this point. No other three dimensional model is created than the interpretation made in the eye of the observer.

It is an object of the invention to obtain a three dimensional model method that is less complicated to carry out, is carried out automatically, can take care of the occlusion complex of problems, and that can build a detailed model of a realistic or real three dimensional world.

SUMMARY OF THE INVENTION

The object of the invention is obtained by a three dimensional method according to the first paragraph characterized in that an existing 3D model based on images taken from above is matched with a 3D model based on images taken from ground level in order to improve an overall 3D model.

The images taken from ground preferably comprise information about position and attitudes of the camera when the images from ground level were taken and direction of each pixel.

A three dimensional model based on images taken from above and matching with images taken from ground level enables handling of multiple depths seen from ground based systems and for example when a tree is located in front of a building by dividing observations of the tree and the building.

Preferably, the 3D model based on images taken from ground level is controlled by the existing 3D model based on images taken from above.

According to a preferred method image information taken from ground level having a high resolved texture is used to enhance images of the existing 3D model based on images taken from above by replacing essentially vertical and downwards inclined surfaces with images based on images taken from ground level. The use of high resolved images taken from ground as textures in the total model results in an increased image quality of the total model.

According to a still preferred method the matching of the existing 3D model based on images taken from above with images taken from the ground level is based on position and attitude information of images taken.

According to another preferred method all images available from the ground level and images taken from above are considered for estimating a three dimensional model both in terms of geometries and textures. This method utilizes a maximum of image information in the creation of a final three dimensional model.

Advantageously high level surfaces such as roofs are estimated and textured from images taken from above and vertical surfaces such as house facades are estimated from available images taken from ground level and textured from these images. This way of estimating ensures that high quality image information is used in the building of a final three dimensional model.

When taking images from the ground level and from above some deviation between the exact position and the exact attitude of an image is likely to occur. In order to minimise such deviations it is proposed that images taken from the ground are mutually correlated to compensate for position and attitude deviations. Furthermore it is proposed that images taken from the ground in a 3D model are correlated with images taken from above in a 3D model to compensate for position and attitude deviations. A fitting procedure for mutual images from the ground level as well as in combination with images from above is possible.

BRIEF DESCRIPTION OF THE DRAWINGS

The invention will now be described in more detail with reference to the accompanying drawings in which:

FIGS. 1a-1d schematically illustrate the occlusion problem involving obscuration and such that:

FIG. 1a is a view of a house from above illustrating imaging by a ground based camera, FIG. 1b is a ground based view of the house of FIG. 1a, FIG. 1c is a view from above of the house of FIGS. 1a and 1b to be imaged from above, and FIG. 1d is a ground based view of the house illustrating imaging by a camera imaging from above.

FIG. 2 schematically illustrates the capturing of images from above.

FIG. 3a illustrates an example of a known stereo scheme used to collect data.

FIG. 3b illustrates a proposed stereo scheme to be used to collect data.

FIG. 4 schematically illustrates an example of a model method based on combination of ground based images and images taken from above.

DETAILED DESCRIPTION

Figure 1A:
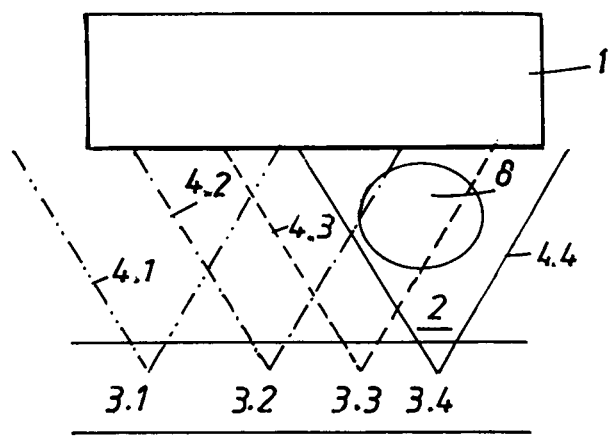
Figure 1B:
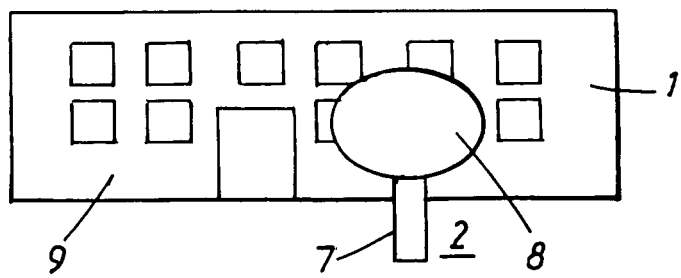

The obscuration problem will now be described with reference to FIGS. 1a-1d showing a house 1 with a tree 2 in front of the house 1. According to FIG. 1a, a camera is positioned to take images in positions 3.1-3.4 and the image fields of view are indicated by angle indications 4.1-4.4. These images are used to form a three dimensional ground based model. From the angle indications shown it is obvious that the tree 2 especially by its crown 8 is hiding parts of the house façade 9. Furthermore depending on light conditions the tree 2 will create not shown shadows on the house façade 9.

According to FIGS. 1c and 1d imaging from above is illustrated. Again four camera positions 5.1-5.4 are shown with corresponding angle indications 6.1-6.4 indicating the image fields of view for the taken images. These images are used to form a three dimensional model taken from above. When imaging from above from an airborne system certain parts of the real environment are excluded from imaging. In this case the trunk 7 of the tree 2 is invisible.

However by combing image information from ground based images and images from airborne systems most of occlusion and obscuration problems are met. If a three dimensional model based on airborne images is available this a priori knowledge can be used to handle the obscuration of the tree 2, i.e. several different depths must be handled in the observation direction. On the other hand the three dimensional model taken from above can not observe the tree trunk 7 which can be modelled from the ground based three dimensional model.

The principles for collecting images to be used for stereo imaging are now discussed. According to FIG. 2 an air plane 11 provided with a camera 12 is shown in a first position by unbroken lines and in a second position by broken lines above a landscape 13. As illustrated in the figure the landscape differs in height and there are abrupt configurations 14 such as houses and more billowing configurations 15 such as billowing hills. The position of the camera in the first position is denoted by x, y, z and the attitude by α, β, γ. Accordingly, all six degrees of rotation and position are available. The corresponding position and attitude for the second camera position shown are denoted by x', y', z' and α', β', γ'. The coverage of the landscape by the camera 12 is indicated by lines 16, 17 for the first position and 16', 17' for the second position. When comparing an image of the landscape taken from the first position with an image taken from the second position an overlapping section 18 can be identified. If the overlapping 18 section is observed, it can be seen that an image taken from the first position lacks image information about the vertical right part 14.1 of the abrupt configuration 14, while the same vertical right part 14.1 is easily imaged from the second position. Accordingly, being in possession of a plurality of images covering the same scene position, increases the possibilities to build up three dimensional images coinciding closer with the real world.

FIG. 3a shows an example of a known stereo scheme. Such a scheme is obtained by flying an air plane or other airborne vehicle provided with a downwards looking camera above the landscape such that there is an overlap of about 50-60% in the direction of flight and for adjacent flights principally without overlap and in practice about 10% in order to avoid holes. In the figure an upper gray strip 19 illustrates the footprints of a first flight and a lower gray strip 20 the footprints of a second flight. In the strips 19, 20 the footprints from every second image are illustrated as solid rectangles 23-30 while the footprints from every second image in between are illustrated as rectangles 31-36 delimited by dashed lines perpendicular to the flight direction 22. By the scheme shown each point on the ground is covered with two images and from these images stereo estimates can be calculated.

FIG. 3b shows another proposed example of a stereo scheme that can be used. In the proposed scheme the upper and lower strips 19, 20 illustrates an overlap of 80% in the direction of flight 22 and an overlap between adjacent flights of 60%. Suitable proposed overlapping in the flight direction is about 60-90% and about 60-80% between adjacent flights. In the different strips 19, 20 five different rectangles 37-41 can be identified illustrating five consecutive footprints that are repeatably present along the flight direction. The five rectangles are indicated by five different delimiting lines (solid, dash-dotted, short-dashed, long-dashed, and dash-double-dotted) perpendicular to the flight direction. By the scheme as shown and described with reference to FIG. 3b each point on the ground is covered with at least 10 images and all these images can contribute to the stereo estimates for each point in the scene.

The image processing involved in the 3D model method of the invention is now described with reference to FIG. 4.

Images 44 collected according to the description above with reference to the FIGS. 2, 3a and 3b and that can be available in a storing unit 45 are applied to a stereo disparity block 42 calculating a stereo disparity for each possible image pair n covering the same scene position. For each image involved the position x, y, z and the attitude α, β, γ from which the image is taken are known, i.e. all six degrees of rotation and position are known. Furthermore, a measure of the certainty for each stereo disparity is estimated. This measure can be based upon local contrasts, visibility and/or resolution.

The stereo disparities calculated in the stereo disparity block 42 are subjected to a weighting process in a weighting block 43 taking notice of estimated certainty measures. Available as an output of the weighting block 43 after weighting is a height model 46 that can be visualised as a grid. From this first model the original stereo estimates are reweighted automatically and adaptively based on normal vectors of the estimated 3D model taking information such as visibility, local contrast, resolution and visibility such as obscuration into consideration. In this connection for example an image taken straight above a building is used to estimate the roof structure and not the sides of a building. Another example could be to avoid mixing of the front side and back side of buildings. By an iterative process taking advantage of images from aside and connected measurements a more reliable 3D model is obtained disclosing hidden sections. In the weighting process outliers can be sorted out and as a straight forward example the remaining stereo disparities for a scene are weighted together by averaging or other mathematical methods to find a concentration of similar stereo disparities.

In a more simple calculation just one stereo pair is enough requiring just two images of the same area and the weighting can be simplified or even left out.

Based upon the 3D model 46 on the output of the weighting block 43 a wire model 47 of triangles is built up and the triangles are draped with images fitting the direction of viewing.

A similar imaging is taken up from the ground level and images 54 for stereo treatment are stored in a storing unit 55 and treated in a stereo block 52. For each image involved, as for imaging from above, the position x, y, z and the attitude α, β, γ from which the image is taken are known, i.e. all six degrees of rotation and position are known. The stereo disparities can then be subjected to weighting in a weighting block before a three dimensional grid model 56 is built up. When combining ground based images with images taken from above, image information are fetched from the grid model 56 on request from the image model for images taken from above and high resolved texture are fetched from the ground based grid model to complete the wire model 47 of triangles with draping taken from the ground based grid model. All combining of texture from the ground based model and the model based on images taken from above utilizes the fact that complete information concerning position x, y, z and attitude $\alpha, \beta, \gamma$ from which the images are taken are known for all images.

In FIG. 4 the image treatment has been illustrated by different processing channels for images taken from above and images taken from ground level. It is, however, possible that at least some of the included blocks are common for both channels.

The invention is not limited to the method exemplified above but may be modified within the scope of the attached claims.

The invention claimed is:

1. A three dimensional model method based on combination of ground based camera images and camera images taken from above, the method comprising:

matching an existing 3D model based on images taken from above with a 3D model based on images taken from ground level in order to improve an overall 3D model, wherein the 3D model based on images taken from above and the 3D model based on images taken from ground level are both built up from stereo image treatments, and wherein the matching to obtain the overall 3D model is an automatically carried out process comprising estimation of geometry and image texture from images taken from the ground level and images taken from above, and estimation of visibility in the overall 3D model from respective camera positions to control the process with regard to occlusions.

2. The method according to claim 1, wherein the 3D model based on images taken from ground level is by request controlled by the existing 3D model based on images taken from above.

3. The method according to claim 1, wherein all images available from the ground level and images taken from above are considered for estimating a three dimensional model both in terms of geometries and image textures.

4. The method according to claim 1, wherein in the matching of the existing 3D model based on images taken from above with images taken from the ground level position and attitude information of images taken are used.

5. The method according to claim 1, wherein image information taken from ground level having a high resolved texture is used to enhance images of the existing 3D model based on images taken from above by replacing essentially vertical and downwards inclined surfaces with images based on images taken from ground level.

6. The method according to claim 1, wherein high level surfaces are estimated and textured from images taken from above.

7. The method according to claim 1, wherein vertical surfaces are estimated from available images taken from ground level and textured from these images.

8. The method according to claim 1, wherein images taken from the ground are mutually correlated to compensate for position and attitude deviations.

9. The method according to claim 1, wherein images taken from the ground in a 3D model are correlated with images taken from above in a 3D model to compensate for position and attitude deviations.

\* \* \* \* \*